United States Patent
Benich

(10) Patent No.: US 7,491,054 B2
(45) Date of Patent: Feb. 17, 2009

(54) DEVICE FOR TRANSFERRING PREFORMS COMPRISING CAST PLATES

(75) Inventor: Yvan Benich, Octeville sur Mer (FR)

(73) Assignee: Sidel Participations, Octeville sur Mer (FR)

( * ) Notice: Subject to any disclaimer, the term of this patent is extended or adjusted under 35 U.S.C. 154(b) by 359 days.

(21) Appl. No.: 10/583,132

(22) PCT Filed: Nov. 26, 2004

(86) PCT No.: PCT/EP2004/053118

§ 371 (c)(1),
(2), (4) Date: Aug. 16, 2006

(87) PCT Pub. No.: WO2005/068329

PCT Pub. Date: Jul. 28, 2005

(65) Prior Publication Data

US 2007/0098837 A1    May 3, 2007

(30) Foreign Application Priority Data

Dec. 19, 2003    (FR) .................................. 03 51120

(51) Int. Cl.
*B65G 17/06*    (2006.01)
*B29C 31/08*    (2006.01)

(52) U.S. Cl. ........................................ 425/534; 198/852
(58) Field of Classification Search ................. 425/534; 198/803.12, 850, 852, 867.09
See application file for complete search history.

(56) References Cited

U.S. PATENT DOCUMENTS 5,857,562 A    1/1999    Evrard
6,125,996 A    10/2000    Cornet et al.

FOREIGN PATENT DOCUMENTS

| EP | 0 935 572 | 8/1999 |
|---|---|---|
| FR | 2 728 547 | 6/1996 |
| GB | 767 567 | 2/1957 |

*Primary Examiner*—Robert B Davis
(74) *Attorney, Agent, or Firm*—Young & Thompson

(57) ABSTRACT

A transfer device (10), particularly for transferring preforms for the manufacture of receptacles by blow-moulding, includes a series of plates (12A, 12B) to which are attached elements (14) of supporting preforms, the plates (12A, 12B) being coupled one after the other in an endless movable curvilinear chain by articulations (16) capable of allowing the curvilinearity of the movable chain and simultaneously the rotation of the plates (12A, 12B) about a horizontal axis (A1) to allow the preforms to be turned upside down and/or set upright, characterized in that each plate (12A, 12B) is made in a single piece by moulding.

14 Claims, 2 Drawing Sheets

DEVICE FOR TRANSFERRING PREFORMS COMPRISING CAST PLATES

The invention relates to a transfer device.

The invention relates more particularly to a transfer device, particularly for transferring preforms for the manufacture of receptacles by blow-moulding, comprising a series of plates to which are attached means of supporting preforms, the plates being coupled one after the other in an endless movable curvilinear chain by means of articulations capable of allowing the curvilinearity of the movable chain and simultaneously the rotation of the plates about a horizontal axis to allow the preforms to be turned upside down and/or set upright.

Such a transfer device is already known, particularly from documents FR-A-2.728.547 and EP-B-0.935.572, which each describe and represent a device for transferring hollow bodies such as preforms for producing receptacles by blow-moulding.

The plates that are fitted to this transfer device are designed to withstand strong mechanical stresses.

The plates must, in addition, withstand strong thermal stresses. Specifically, the chain is designed particularly to transport the preforms into a heating oven, in order to heat the preforms to a temperature greater than glass transition temperature, before carrying out the blow-moulding operation.

In order to be able to withstand all these stresses, each plate is usually made of an aluminium alloy by machining.

This type of plate particularly has the disadvantage of being extremely costly to produce.

Specifically, a large quantity of material is wasted in chips during the machining operations, and a large number of machining stages is necessary.

In addition, rectification stages must be used in order to be able to comply with the manufacturing tolerances of the plate.

Another disadvantage of machined plates is that the parts obtained are relatively solid, which does not make it possible to minimize the pitch between two consecutive preforms transported by the chain of the transfer device.

The invention aims to remedy these disadvantages in a simple, effective and economic manner.

For this purpose, the invention proposes a transfer device of the type previously described, characterized in that each plate is made in a single piece by moulding.

According to other features of the invention:

- each plate generally has the shape of a chain link and comprises a top horizontal plate and a bottom horizontal plate that are connected by at least one substantially vertical upright, the means of support comprise, for each plate, two tubular bodies that are attached to the plate, either side of the upright, and that extend vertically through associated holes formed in the two horizontal plates, each tubular body being designed to receive internally a vertical rod for supporting a preform, and each plate, called the first plate, is connected to an adjacent plate, called the second plate, via an articulation comprising a first socket mounted so as to rotate about a tubular body of the first plate and a second socket mounted so as to rotate about a tubular body of the second plate, the two sockets being mounted so as to pivot one relative to the other about a substantially horizontal pivot axis;
- the vertical upright of each plate comprises at least one transverse shaft that is furnished, at its free end, with an idler wheel designed to interact with a fixed cam, particularly in order to control the turning upside down and/or the setting upright of the preforms;
- each plate is moulded onto the associated transverse shaft that forms an insert;
- the sections of the transverse shaft that are overmoulded comprise raised elements or cavities;
- the transverse shaft is force-fitted into the associated plate;
- the sections of the shaft that are received in the plate comprise grooves made by knurling;
- each socket is made in a single piece by moulding;
- each socket consists of two coaxial rings that are mounted so as to rotate on the associated tubular body and that are moulded with a circumferential portion of axial wall;
- the portion of axial wall of the first socket is furnished with a bearing and the portion of axial wall of the second socket is assembled onto the portion of axial wall of the first socket by means of a horizontal rivet which extends axially in the bearing in order to form the pivot axis;
- each socket is mounted so as to rotate directly on the associated tubular body, with no intermediate element of radial interposition;
- each socket is made of self-lubricating material such as brass;
- each plate and/or each socket is pressure injection moulded;
- each plate and/or each socket is made of Zamac;
- each plate and/or each socket is made of copper alloy.

Other features and advantages of the invention will appear on reading the following detailed description for the comprehension of which reference should be made to the appended drawings in which.

For the description of the invention, the vertical, longitudinal and transverse directions will be adopted in a non-limiting manner according to the V, L, T indication given in the figures.

In the following description, identical, similar or analogous elements will be identified by the same reference numbers.

Figure 1:
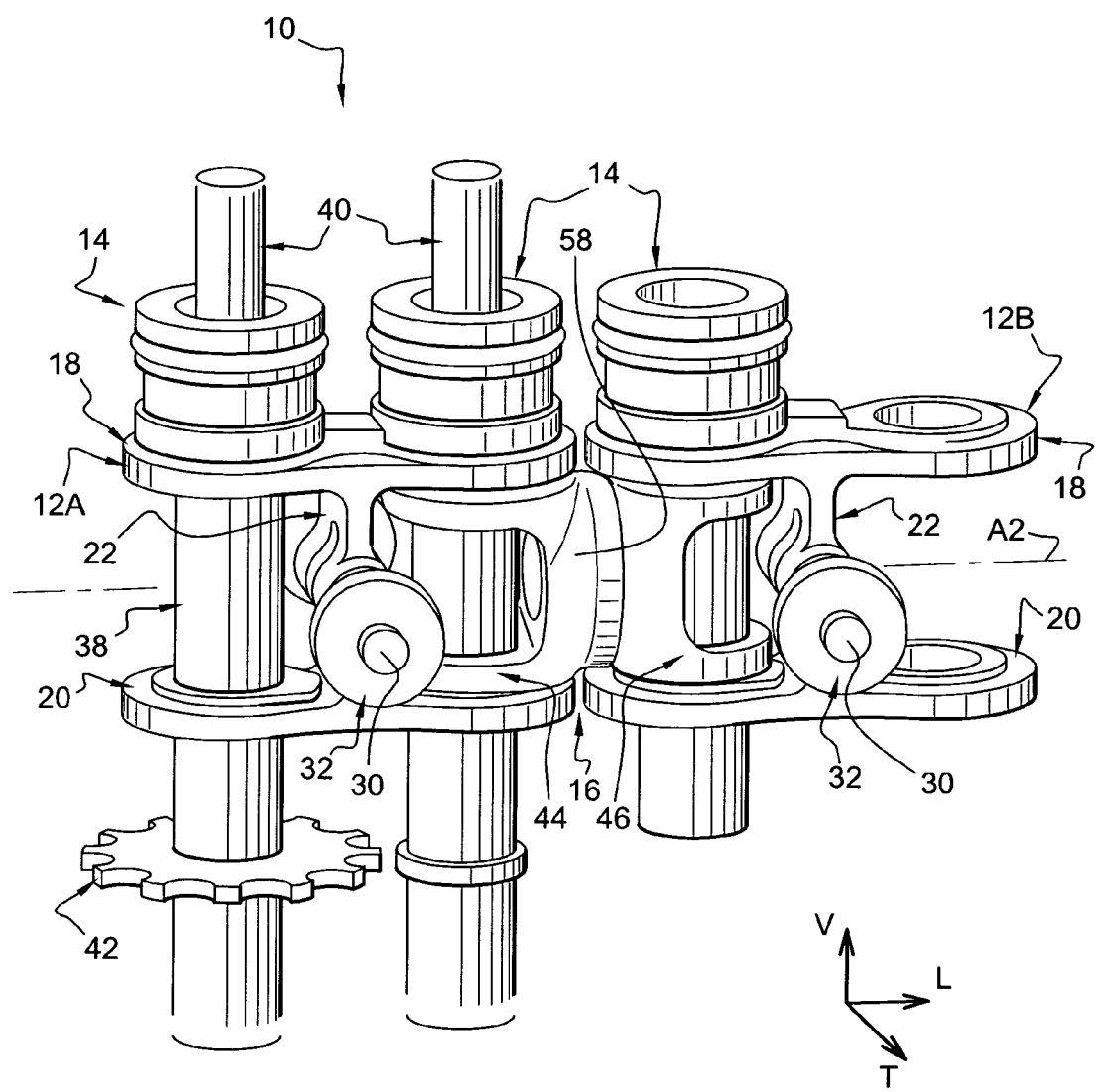
FIG. 1 is a view in perspective that represents schematically a portion of a transfer device produced according to the teachings of the invention.

FIG. 1 shows a transfer device 10 that is made according to the teachings of the invention.

Preferably, the transfer device 10 is used to transport preforms (not shown) that are used in the manufacture of receptacles by blow-moulding.

The transfer device 10 comprises a series of plates 12A, 12B to which are attached means 14 of supporting preforms so that each plate 12A, 12B can support two preforms here, as will be explained hereinafter.

Such a type of transfer device 10 is described in particular in document EP-B-0.935.572, already cited in the preamble of the present application, to which reference may be made for further details.

The plates 12A, 12B are designed to be coupled one after the other in an endless movable curvilinear chain by means of articulations 16 capable of allowing the curvilinearity of the movable chain and simultaneously the rotation of the plates 12A, 12B about a horizontal pivot axis A1 to allow the preforms to be turned upside down and/or set upright.

In the rest of the description, the plates 12A, 12B and the articulation 16 will be described in a stable position, corresponding, for example, to a position in which the preforms are turned upside down so that they then extend vertically upwards.

Figure 2:
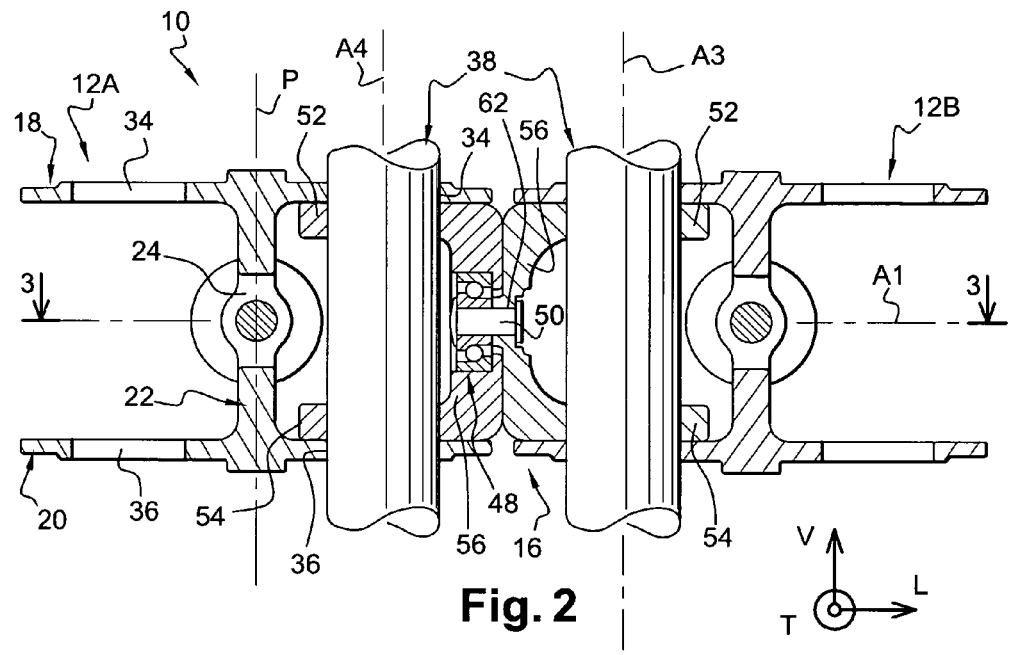
FIG. 2 is a view along the sectional plane 2-2 that partially represents the portion of the transfer device of FIG. 1.
Figure 3:
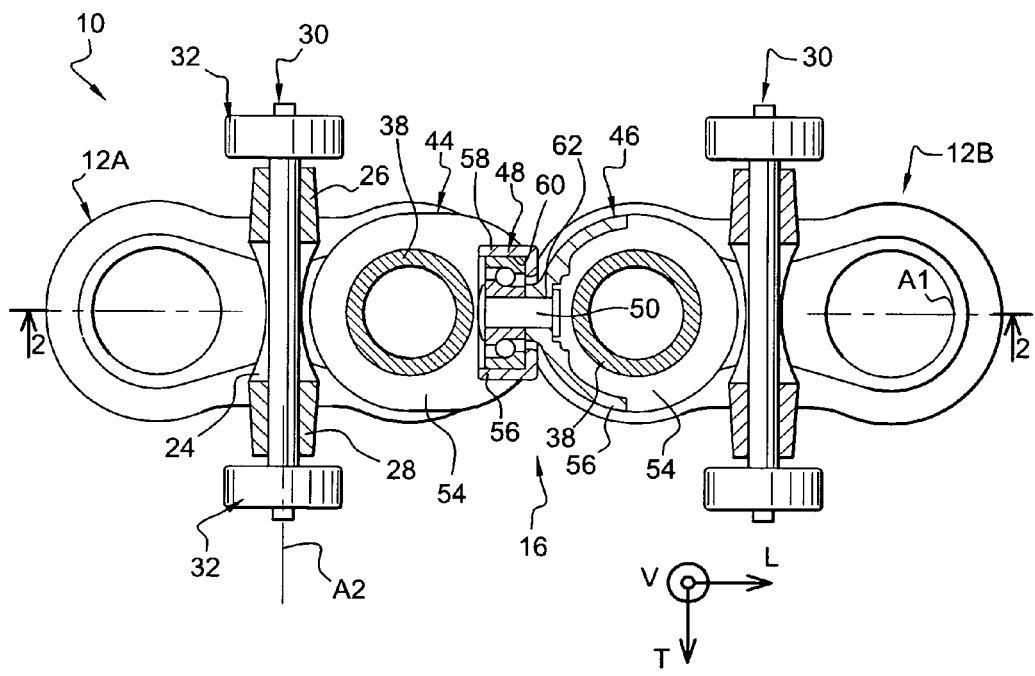
FIG. 3 is a view along the sectional plane 3-3 that partially represents the portion of the transfer device of FIG. 1.

In FIGS. 1 to 3, the pivot axis A1 extends generally in a longitudinal direction.

To simplify the representation, only a first plate 12A and a second plate 12B, and the articulation 16 by which they are coupled, have been shown in FIGS. 1 to 3.

Advantageously, each plate 12A, 12B generally has the shape of a chain link and comprises a top horizontal plate 18 and a bottom horizontal plate 20 that are connected by at least one substantially vertical upright 22.

The upright 22 here has the shape of a vertical transverse plate perforated by a central window 24.

The upright 22 comprises, transversely either side of the window 24, two transverse tubular sections 26, 28 designed to receive with attachment a transverse shaft 30.

The shaft 30 is furnished, at each of its free ends, with a wheel 32 that is mounted so as to rotate freely about its transverse axis A2 and that is designed to interact with an associated fixed cam (not shown). For example, one of the wheels 32. interacts with a cam in order to control the turning upside down and the setting upright of the preforms, and the other wheel 32 interacts with another cam in order to guide the associated plate 12A, 12B, particularly in the rectilinear portions of the chain.

According to the embodiment shown here, each plate 12A, 12B allows a vertical transverse plane of symmetry P which passes through the axis A2 of the transverse shaft 30.

The top plate 18 comprises two vertical holes 34 that are made either side of the plane of symmetry P and that are vertically facing respectively two similar holes 36 made in the bottom plate 20.

Each plate 12 therefore comprises two pairs of holes 34, 36, each pair comprising a hole 34 in the top plate 18 and an associated hole 36 in the bottom plate 20.

Each pair of holes 34, 36 is designed to receive vertically with attachment a tubular body 38 belonging to the means of support 14.

The tubular body 38 extends above the top plate 18 and below the bottom plate 20, and it is held vertically on the plate 12 by appropriate means.

A vertical support rod 40 is inserted into each tubular body 38, so that it can rotate about its vertical axis and so that it can slide vertically in the tubular body 38.

Each vertical rod 40 may be furnished, at one of its ends, with a means (not shown) of gripping a preform, and, at the other end, with means for rotating it, such as a pinion 42.

Now the articulation 16 will be described; it allows the first plate 12A to be coupled to the second plate 12B.

The articulation 16 comprises a first socket 44 which is mounted so as to rotate about a tubular body 38 of the first plate 12A and a second socket 46 which is mounted so as to rotate about a tubular body 38 of the second plate 12B.

The first plate 12A can therefore pivot, relative to the second plate 12B, about a vertical axis of articulation A3 passing through the associated tubular body 38 of the second plate 12B.

Similarly, the second plate 12B can pivot, relative to the first plate 12A, about a vertical axis of articulation A4 passing through the associated tubular body 38 of the first plate 12A.

The first socket 44 is mounted so as to pivot on the second socket 46, about the horizontal pivot axis A1.

Accordingly, the first socket 44 is furnished with a bearing 48 and the second socket 46 is assembled onto the first socket 44 by means of a horizontal rivet 50 which extends axially in the bearing 48 in order to form a pivot shaft.

Preferably, the rivet 50 is snapped onto the articulation 16.

According to the teachings of the invention, each plate 12A, 12B is made in a single piece by moulding.

Preferably, an injection moulding method is used to manufacture the plates 12A, 12B, which makes it possible for the plates 12A, 12B to have a good resistance to mechanical and thermal stresses.

Preferably, the material forming the plate is Zamac or a copper alloy such as brass.

It has been noted that obtaining the plates 12A, 12B by pressure injection makes it possible to limit the number of machining processes, even to eliminate the need to carry out machining processes. In particular, the plates 12A, 12B more easily comply with the dimensional tolerances, so that it is not necessary to make use of rectification steps.

Advantageously, each plate 12A, 12B is moulded onto its transverse shaft 30. Each transverse shaft 30 is then arranged as an insert in the mould of the respective plate 12A, 12B.

This feature makes it easier to mount the shafts 30 onto the plates 12A, 12B, without weakening its structures.

In addition, in the transfer devices according to the prior art such as that described in document EP-B-0.935.572. it has been noted that the transverse shafts supporting the wheels, that are screwed into the upright of the plate, have a propensity to unscrew unexpectedly particularly due to the large variations of temperature, which leads to malfunctions of the plate guidance system.

The moulding of the plates 12A, 12B onto the transverse shafts 30 makes it possible to remedy this disadvantage.

Advantageously, the overmoulded sections of the transverse shafts 30, that is to say the sections of the shafts 30 that are received in the transverse tubular sections 26, 28 of the uprights 22, may comprise raised elements or cavities (not shown) such as ribs or grooves, in order to improve the immobilization of the transverse shafts 30 in the plates 12A, 12B.

According to a variant embodiment (not shown), the transverse shaft 30 may undergo a knurling step before being force-fitted into the upright 22 of the plate 12.

According to another feature of the invention, each socket 44, 46 is made in a single piece by moulding.

Advantageously, the sockets 44, 46 are moulded according to the same injection moulding method as the plates 12A, 12B and from the same materials.

Thanks to the use of moulded sockets 44, 46, it is possible to lighten the shape of each socket 44, 46 by arranging material only in the effective parts.

Thus, according to a preferred embodiment of the invention, each socket 44, 46 consists of two coaxial rings 52, 54 that are mounted so as to rotate on the associated tubular body 38 and that are moulded with a circumferential portion of axial wall 56.

According to the embodiment shown here, the first socket 44 comprises an annular cylindrical body 58 coaxial with the pivot axis A1 which delimits a housing 60 designed to receive the bearing 48.

On the side of the first plate 12A, the cylindrical body 58 of the first socket 44 forms the circumferential portion of the axial wall 56.

The circumferential portion of the axial wall 56 of the second socket 46 comprises a hole 62 coaxial with the pivot axis A1 that is designed to receive an end section of the rivet 50.

Preferably, the sockets 44, 46, moulded according to the invention, are mounted so as to rotate directly on the associated tubular bodies 38, with no intermediate element of radial interposition.

In this case, it is desirable for the sockets 44, 46 to be made of a self-lubricating material, for example brass.

Thus, the articulation 16 according to the invention requires no intermediate ring as in the transfer devices according to the prior art, which makes the mounting of the articulations 16 easier by reducing the number of pieces necessary to manufacture the transfer device 10.

In addition, the absence of an intermediate ring makes it possible to produce a more compact articulation 16, particularly in longitudinal space requirement, so that it is possible to reduce the longitudinal pitch between two tubular bodies 38, hence reducing the pitch between two preforms succeeding one another in the chain.

According to a variant embodiment (not shown), the articulation 16 may be furnished with spacers that are interposed longitudinally between the first socket 44 and the second socket 46, in order to adapt the value of the pitch between two preforms according to the size of the preforms. The sockets 44, 46 of the articulation 16 may be machined appropriately, after the moulding, in order to allow the arrangement of the spacers.

The invention claimed is:

1. Transfer device (10), particularly for transferring preforms for the manufacture of receptacles by blow-moulding, comprising a series of plates (12A, 12B) to which are attached means (14) of supporting preforms, the plates (12A, 12B) being coupled one after the other in an endless movable curvilinear chain by means of articulations (16) capable of allowing the curvilinearity of the movable chain and simultaneously the rotation of the plates (12A, 12B) about a horizontal axis (A1) to allow the preforms to be turned upside down and/or set upright, characterized in that each plate (12A, 12B) is made in a single piece by moulding, in that each plate (12A, 12B) generally has the shape of a chain link and comprises a top horizontal plate (18) and a bottom horizontal plate (20) that are connected by at least one substantially vertical upright (22), in that the means of support (14) comprise, for each plate (12A, 12B), two tubular bodies (38) that are attached to the plate (12A, 12B), either side of the upright (22), and that extend vertically through associated holes (34, 36) formed in the two horizontal plates (18, 20), each tubular body (38) being designed to receive internally a vertical rod (40) for supporting a preform, and in that each plate (12A, 12B), called the first plate (12A), is connected to an adjacent plate, called the second plate (12B), via an articulation (16) comprising a first socket (44) mounted so as to rotate about a tubular body (38) of the first plate (12A) and a second socket (46) mounted so as to rotate about a tubular body (38) of the second plate (12B), the two sockets (44, 46) being mounted so as to pivot one relative to the other about a substantially horizontal pivot axis (A1).

2. Device (10) according to claim 1, characterized in that the vertical upright (22) of each plate (12A, 12B) comprises at least one transverse shaft (30) that is furnished, at its free end, with an idler wheel (32) designed to interact with a fixed cam, particularly in order to control the turning upside down and/or the setting upright of the preforms.

3. Device (10) according to claim 2, characterized in that each plate (12A, 12B) is moulded onto the associated transverse shaft (30) that forms an insert.

4. Device (10) according to claim 3, characterized in that the sections of the transverse shaft (30) that are overmoulded comprise raised elements or cavities.

5. Device (10) according to claim 2, characterized in that the transverse shaft (30) is force-fitted into the associated plate (12A, 12B).

6. Device (10) according to claim 5, characterized in that the sections of the shaft (30) that are received in the plate (12A, 12B) comprise grooves made by knurling.

7. Device (10) according to claim 2, characterized in that each socket (44, 46) is made in a single piece by moulding.

8. Device (10) according to claim 7, characterized in that each socket (44, 46) consists of two coaxial rings (52, 54) that are mounted so as to rotate on the associated tubular body (38) and that are moulded with a circumferential portion of axial wall (56).

9. Device (10) according to ,claim 8, characterized in that the portion of axial wall (56) of the first socket (44) is furnished with a bearing (48) and in that the portion of axial wall (56) of the second socket (46) is assembled onto the portion of axial wall (56) of the first socket (44) by means of a horizontal rivet (50) which extends axially in the bearing (48) in order to form the pivot axis (A1).

10. Device (10) according to claim 8, characterized in that each socket (44, 46) is mounted so as to rotate directly on the associated tubular body (38), with no intermediate element of radial interposition.

11. Device (10) according to claim 10, characterized in that each socket (44, 46) is made of self-lubricating material such as brass.

12. Device (10) according to claim 1, characterized in that each plate (12A, 12B) and/or each socket (44, 46) is pressure injection moulded.

13. Device (10) according to claim 1, characterized in that each plate (12A, 12B) and/or each socket (44, 46) is made of Zamac.

14. Device (10) according to claim 1, characterized in that each plate (12A, 12B) and/or each socket (44, 46) is made of copper alloy.

* * * * *